United States Patent [19]

Hirai et al.

[11] Patent Number: 4,740,363

[45] Date of Patent: Apr. 26, 1988

[54] ALKALI GENERATING PROCESS

[75] Inventors: Hiroyuki Hirai; Yoshiharu Yabuki; Kozo Sato, all of Kanagawa, Japan

[73] Assignee: Fuji Photo Film Co., Ltd., Kanagawa, Japan

[21] Appl. No.: 890,443

[22] Filed: Jul. 30, 1986

[30] Foreign Application Priority Data

Jul. 31, 1985 [JP] Japan ................................ 60-169585
Oct. 15, 1985 [JP] Japan ................................ 60-229720

[51] Int. Cl.$^4$ ...................... C01B 15/02; B01D 11/00; G03C 5/54; G03C 1/48
[52] U.S. Cl. ................................ 423/641; 252/192; 423/181; 430/203; 430/353; 430/486; 430/491
[58] Field of Search .................... 252/188.21, 188.31, 252/192; 423/181, 641, 643

[56] References Cited

U.S. PATENT DOCUMENTS

| | | | |
|---|---|---|---|
| 3,260,598 | 7/1966 | Yutzy et al. | 430/227 |
| 3,882,018 | 5/1975 | Depree | 423/24 |
| 4,115,433 | 9/1978 | Cosby et al. | 423/417 |
| 4,470,951 | 9/1984 | Bradbury et al. | 134/3 |
| 4,525,330 | 6/1985 | Dalton et al. | 423/24 |

Primary Examiner—Gary P. Straub
Attorney, Agent, or Firm—Sughrue, Mion, Zinn, Macpeak, and Seas

[57] ABSTRACT

Alkali is generated from two neutral parts by reacting a complexing agent such as sodium picolinate in one part with a slightly water-soluble metal compound such as zinc oxide in the other part in the presence of water.

6 Claims, No Drawings

ALKALI GENERATING PROCESS

BACKGROUND OF THE INVENTION

This invention relates to a process for generating alkali utilizing a complexing reaction.

Alkalies are greatly versatile reagents finding utility in a variety of reactions including hydrolysis, polymerization, color reaction, redox reaction, and neutralization reaction. There are many commercially available products having alkalies contained therein, as exemplified by silver photographic developing solution and various detergents.

However, it is undesirable to contain alkalies in daily direct access products and products requiring aging stability because alkalies have a stability problem in that they tend to be neutralized by absorbing carbon dioxide in air and a safety problem in that they exert an adverse influence on the living body as by irritating the skin during their handling. If an alkali generating process which can solve the aforementioned stability and safety problems is established, such a process would find great potential applications as well as the above-indicated applications.

U.S. Pat. No. 3,260,598 discloses an image forming process utilizing the mechanism wherein alkali-releasing agents, a very slightly water-soluble metal hydroxide $Z(OH)_n$ and a compound XY are reacted to release hydroxyl ions to increase the pH wherein Z represents a metal atom, X represents a sodium or potassium atom, Y represents a citrate radical, an oxalate radical, a fluorine atom, a ferricyanide radical, a tartrate radical, a sulfite radical, an ethylenedinitrilo tetraacetate radical, a 1,3-diamino-2-propanol tetraacetate radical, a trimethylamine triacetate radical, and other aliphatic nitrogenous polycarboxylate radicals, and n is 2, 3, or 4. This process, however, is less efficient in alkali generation. There is a need for further improvement.

SUMMARY OF THE INVENTION

It is an object of the present invention to provide a novel and improved process capable of instantaneously generating an alkali from a neutral compound while ensuring stability and safety.

According to the present invention, there is provided a process for generating an alkali, comprising reacting a complexing agent having the general formula:

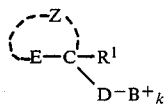  (I)

with a slightly water-soluble metal compound having the general formula:

  (II)

in the presence of water, wherein in formula (I), $D^-$ represents $-CO_2^-$, $-SO_3^-$ or $-PO_3^{2-}$;

$B^+$ represents an alkali metal ion, a substituted or unsubstituted guanidinium ion, an amidinium ion or a quaternary ammonium ion;

k is equal to 1 or 2, the value of k being selected so as to establish equilibrium between anions and cations in formula (I), E represents $-S-$, $-O-$, or $-NR^2-$ and adjoins the C atom in formula (I) wherein $R^2$ represents H or various substituents or a direct bond to form a double bond between the N atom and the adjoining atom;

Z represents a group of atoms necessary to complete a heterocyclic ring with C and E, wherein the heterocyclic ring may have a $-D^-B^+_k$ or another substituent attached thereto or form a fused ring;

$R^1$ represents H or various substituents or a direct bond to form a double bond between the C atom and the adjoining atom; and in formula (II), M represents a metal other than alkali metals;

Y represents an oxide ion, a hydroxide ion, a carbonate ion, a silicate ion, a borate ion, or an aluminate ion;

n and m represents integers selected so as to establish equilibrium between the valences of M and Y; and the compound of formula (II) may contain water of crystallization or form a double salt.

DETAILED DESCRIPTION OF THE INVENTION

According to the alkali generating process of the present invention, a complexing agent having general formula (I) is reacted with a slightly water-soluble metal compound having general formula (II) in the presence of water to generate an alkali.

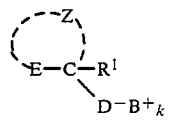  (I)

  (II)

in formula (I), $D^-$ represents $-CO_2^-$, $-SO_3^-$ or $-PO_3^{2-}$;

$B^+$ represents an alkali metal ion, a substituted or unsubstituted guanidinium ion, an amidinium ion or a quaternary ammonium ion;

k is equal to 1 or 2, the value of k being selected so as to establish equilibrium between anions and cations in formula (I), E represents $-S-$, $-O-$, or $-NR^2-$ and adjoins the C atom in formula (I) wherein $R^2$ represents H or various substituents or a direct bond to form a double bond between the N atom and the adjoining atom;

Z represents a group of atoms necessary to complete a heterocyclic ring with C and E, wherein the heterocyclic ring may have a $-D^-B_k^+$ or another substituent attached thereto or form a fused ring; and $R^1$ represents H or various substituents or a direct bond to form a double bond between the C atom and the adjoining atom.

The heterocyclic rings formed by Z, C, and E are preferably 5- or 6-membered heterocyclic rings, especially aromatic heterocyclic rings, for example, pyridine rings, quinoline rings, pyrazine ring, thiophene ring, furan ring, etc. A tetrahydrofuran ring is another preferred example.

Particularly preferred among the complexing agents are those having the general formula:

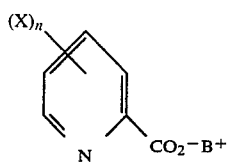

wherein X represents any one of various substituents and n is an integer having a value of 0 to 4. When n is 2 or higher, X's may be the same or different or combined together to form a ring. B+ is as defined for general formula (I).

Preferred examples of X and the substituents attached to the heterocyclic ring completed by Z include —$CO_2^-B^+$ such as —$CO_2K$, —$CO_2Na$, and

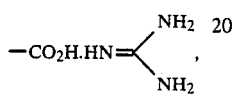

—$SO_3^-B^+$ such as —$SO_3K$, —$SO_3Na$, and

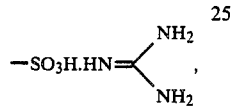

a hydrogen atom; halogen atoms such as Cl, F, Br, and I; cyan radicals, nitro radicals, hydroxyl radicals; substituted or unsubstituted alkyl radicals such as methyl, ethyl, propyl, isopropyl, butyl, and carboxymethyl radicals; cycloalkyl radicals such as a cyclohexyl radical; aralkyl radicals such as a benzyl radical; aryl radicals such as a phenyl radical; alkenyl radicals such as vinyl and allyl radicals; alkynyl radicals such as an ethynyl radical; alkoxy radicals such as methoxy, ethoxy, and methoxyethoxy radicals; aryloxy radicals such as a phenoxy radical; acylamino radicals such as acetylamino and benzoylamino radicals; acyl radicals such as acetyl and benzoyl radicals; amino radicals such as methyl amino and dimethyl amino radicals; alkylthio radicals such as a methylthio radical; arylthio radicals such as a phenylthio radical; heterocyclic radicals such as a pyridine radical; alkylsulfonyl radicals such as a methylsulfonyl radical; arylsulfonyl radicals such as a phenylsulfonyl radical; and carbamoyl radicals such as phenylcarbamoyl and diethylcarbamoyl radicals.

When X's are combined together to form a ring, a benzene ring is the preferred ring.

Preferred examples of B+ include Li+, Na+, K+, Cs+,

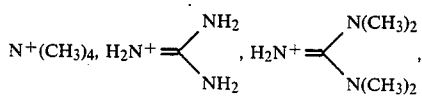

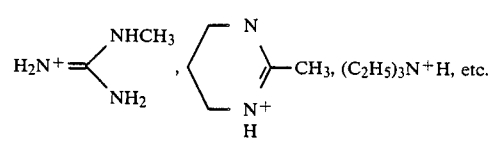

Some preferred non-limiting examples of the complexing agents are illustrated below.

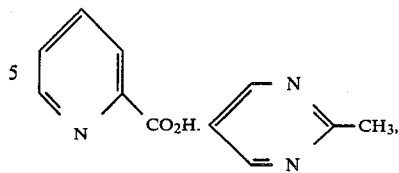

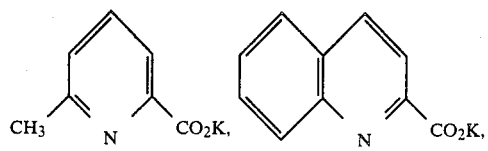

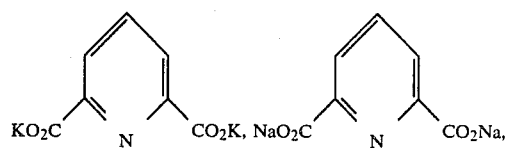

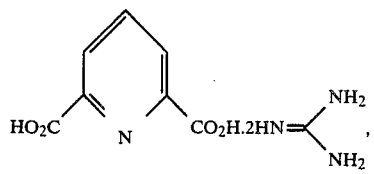

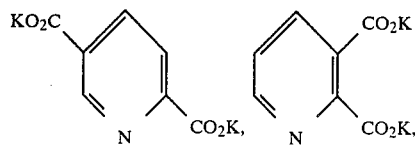

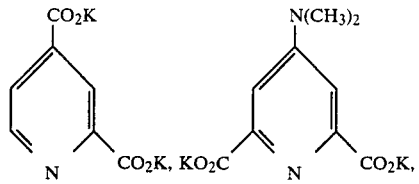

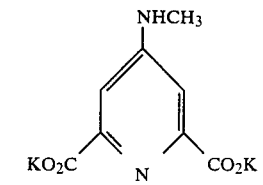

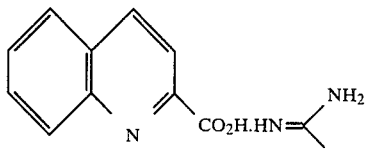

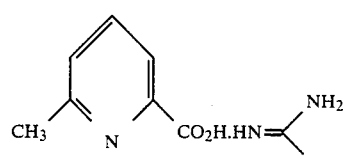

-continued
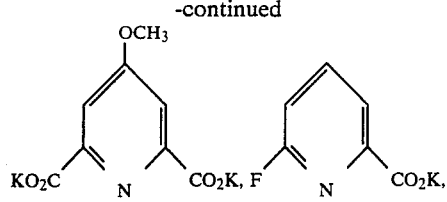
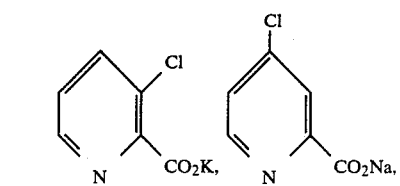
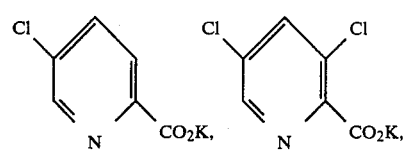
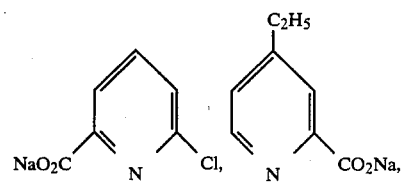
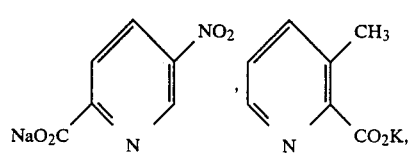
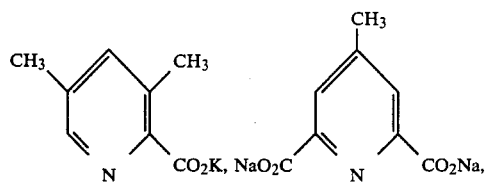
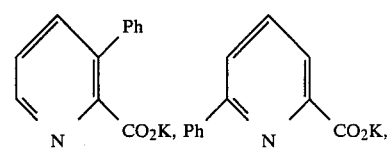
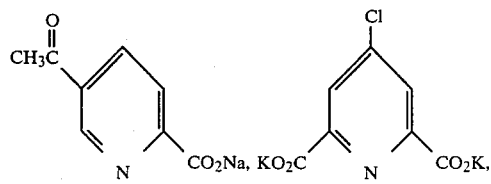
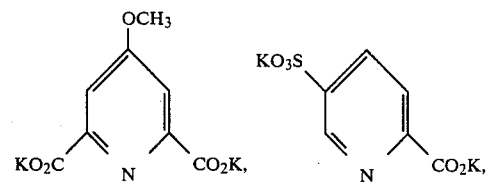
-continued
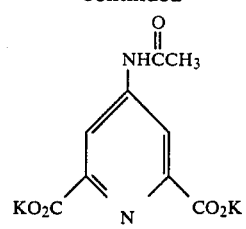
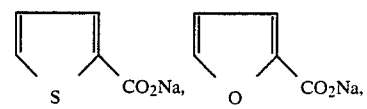
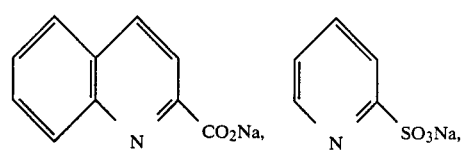
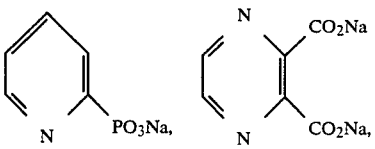
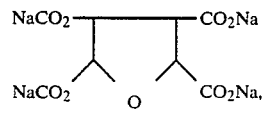
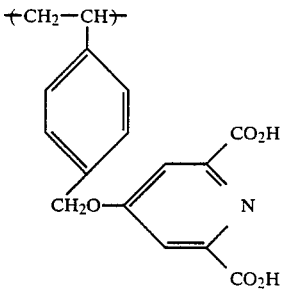
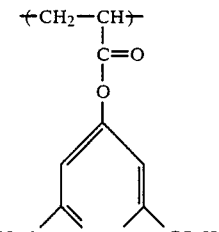
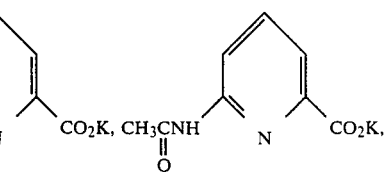

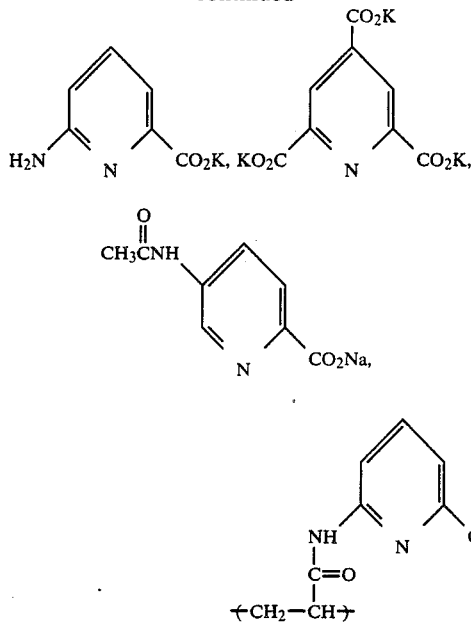

Next, general formula (II) will be described.

In formula (II), M represents a metal other than alkali metals; Y is selected from oxide, hydroxide, carbonate, silicate, borate, and aluminate ions; n and m represents integers selected so as to establish equilibrium between the valences of M and Y.

Preferred examples of M include $Ca^{2+}$, $Ba^{2+}$, $Sr^{2+}$, $Mg^{2+}$, $Zn^{2+}$, $Co^{2+}$, $Ni^{2+}$, $Cu^{2+}$, $Mn^{2+}$, and $Fe^{2+}$.

Preferably, Y represents an oxide ion, a hydroxide ion, or a carbonate ion.

The metal compound of formula (II) may contain water of crystallization or form a double salt (basic salt).

The metal compounds may be used as a mixture of two or more members as well as the complexing agents.

Some illustrative examples of the slightly water-soluble metal compounds of formula (II) are $CaCO_3$, $ZnO$, $Zn(OH)_2$, basic zinc carbonate, basic magnesium carbonate, $Co(OH)_2$, basic cobalt carbonate, $Cu(OH)_2$, basic copper carbonate, $Ni(OH)_2$, basic nickel carbonate, $MnCO_3$, $Fe(OH)_2$, $BaCO_3$, $SrCO_3$, etc.

Among combinations of the complexing agents of formula (I) with the metal compounds of formula (II), the following combinations are particularly preferred although the present invention is not limited thereto.

| Combination No. | Formula (I) | Formula (II) |
|---|---|---|
| 1 | pyridine-2-CO₂K | Basic zinc carbonate |
| 2 | pyridine-2-CO₂K | ZnO |
| 3 | pyridine-2-CO₂K | Zn(OH)₂ |
| 4 | 2,6-pyridine-(CO₂K)₂ | Zn(OH)₂ |
| 5 | 2,6-pyridine-(CO₂K)₂ | ZnO |
| 6 | 2,6-pyridine-(CO₂K)₂ | Basic zinc carbonate |
| 7 | pyridine-2-CO₂H·HN=C(NH₂)NH₂ | Basic zinc carbonate |
| 8 | pyridine-2-CO₂H·HN=C(NH₂)NH₂ | ZnO |
| 9 | pyridine-2-CO₂Na | Basic zinc carbonate |
| 10 | pyridine-2-CO₂Na | ZnO |
| 11 | pyridine-2-CO₂Na | Zn(OH)₂ |

-continued

| Combination No. | Formula (I) | Formula (II) |
|---|---|---|
| 12 | pyridine-2,6-dicarboxylate (NaO₂C–Py–CO₂Na) | Basic zinc carbonate |
| 13 | pyridine-2,6-dicarboxylate (NaO₂C–Py–CO₂Na) | ZnO |
| 14 | pyridine-2,6-dicarboxylate (NaO₂C–Py–CO₂Na) | Zn(OH)₂ |
| 15 | pyridine-2,6-dicarboxylate (NaO₂C–Py–CO₂Na) | CaCO₃ |
| 16 | pyridine-2,3-dicarboxylate dipotassium (CO₂K at 2,3-positions) | Basic zinc carbonate |
| 17 | pyridine-2,5-dicarboxylate disodium (NaO₂C at 5, CO₂Na at 2) | Basic zinc carbonate |
| 18 | pyridine-2,5-dicarboxylate disodium | Zn(OH)₂ |
| 19 | sodium pyridine-2-carboxylate | Co(OH)₂ |
| 20 | pyridine-2,6-dicarboxylate disodium | Co(OH)₂ |
| 21 | pyridine-2,6-dicarboxylate disodium | Basic cobalt carbonate |
| 22 | sodium pyridine-2-carboxylate | Cu(OH)₂ |
| 23 | sodium pyridine-2-carboxylate | Basic copper carbonate |
| 24 | pyridine-2,6-dicarboxylate disodium | Basic copper carbonate |
| 25 | pyridine-2,6-dicarboxylate disodium | Ni(OH)₂ |
| 26 | pyridine-2,6-dicarboxylate disodium | Basic nickel carbonate |
| 27 | pyridine-2,6-dicarboxylate disodium | MnCO₃ |
| 28 | 6-methylpyridine-2-carboxylate potassium (CH₃ at 6, CO₂K at 2) | Basic zinc carbonate |
| 29 | potassium quinoline-2-carboxylate | Zn(OH)₂ |

-continued

| Combination No. | Formula (I) | Formula (II) |
|---|---|---|
| 30 | 4-dimethylamino-2,6-pyridinedicarboxylic acid dipotassium salt | Zn(OH)$_2$ |
| 31 | 4-methoxy-2,6-pyridinedicarboxylic acid dipotassium salt | Basic zinc carbonate |
| 32 | 2,5-pyridinedicarboxylic acid dipotassium salt | ZnO |
| 33 | picolinic acid sodium salt | Basic cobalt carbonate |
| 34 | 2,6-pyridinedicarboxylic acid disodium salt | Cu(OH)$_2$ |
| 35 | picolinic acid sodium salt | Nickel hydroxide |

-continued

| Combination No. | Formula (I) | Formula (II) |
|---|---|---|
| 36 | picolinic acid sodium salt | Basic nickel carbonate |
| 37 | picolinic acid sodium salt | MnCO$_3$ |

The complexing agents of formula (III) which are particularly preferred among the complexing agents as defined in the present invention may generally be synthesized by any desired methods as illustrated below.

A first route utilizes oxidation of α-picolinic acid derivatives as described in J. Am. Chem. Soc., 71, 4152 (1949); ibid, 76, 3167 (1954); J. Org. Chem., 14, 14 (1949); and Org. Synthesis Coll., 3, 740 (1955). This process may be illustrated by the following reaction scheme.

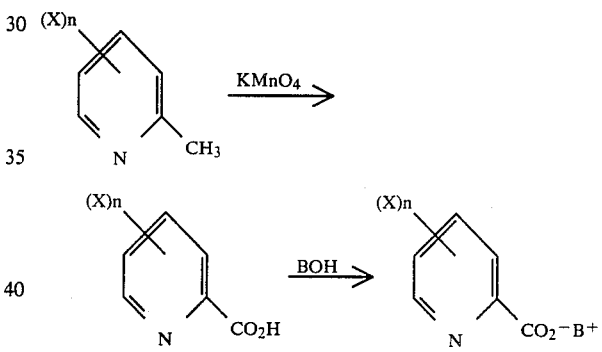

A second route utilizes alkylation or substitution reaction of chelidamic acid esters as described in J. Am. Chem. Soc., 78, 4130 (1956) and Chem. and Ind., 437 (1958). This process may be illustrated by the following reaction scheme.

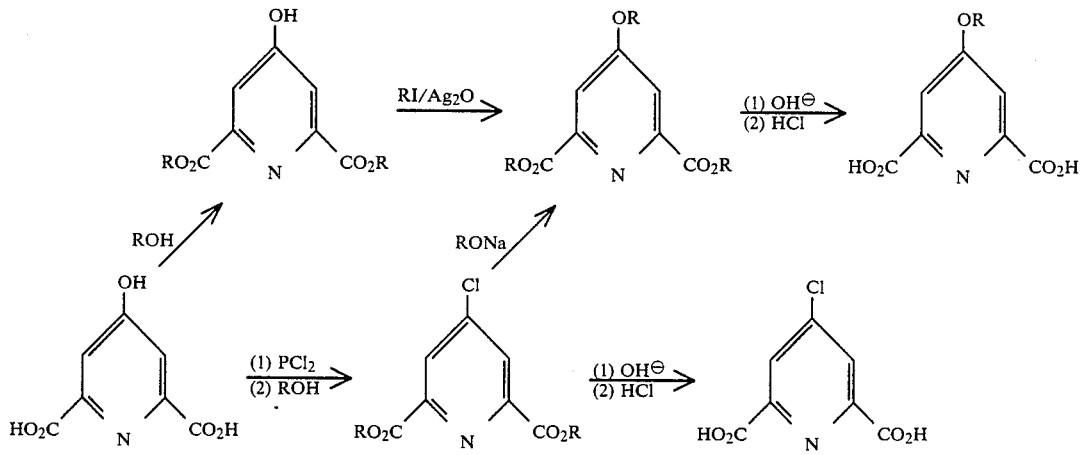

All the compounds illustrated herein as preferred examples are known compounds and may be synthesized by the methods described in the literature.

In the process of the present invention, alkali generation is based on the fact that the complexing agent of formula (I) forms a complex with the metal ion of the metal compound of formula (II).

The alkali generating mechanism will be illustrated by referring to combination No. 3 among the preferred combinations previously mentioned.

When potassium picolinate is mixed with zinc hydroxide in water, they form a more stable zinc complex of picolinic acid according to the following scheme:

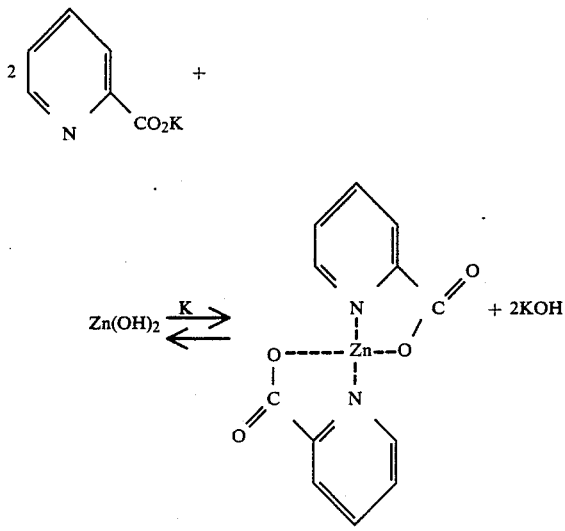

The above-illustrated formula is an equilibrium formula wherein the ratio of potassium picolinate to zinc hydroxide is 2:1. According to the literature, A. E. Martell & R. M. Smith, Critical Stability Constants, Vol. 1, there are also known 1:1 and 3:1 complexes. These complexes exhibit a very high stability constant.

log $K_{ML}$=5.30 log $K_{ML2}$=9.62 log $K_{ML3}$=12.92

The equilibrium is remarkably biased to the right in the above-illustrated formula because the complex is very stable. Therefore, an alkali, KOH in this example generates efficiently as evident from the illustrated formula, resulting in an increase of pH.

In the present invention, the presence of water indicates that water is used as a medium to initiate the complexing reaction. Water may be supplied by adding water from the outside to a mixture of the slightly soluble metal compound and the complexing agent (in crystal form) when it is desired to generate an alkali, or by using an aqueous solution of the complexing agent or a suspension of the slightly soluble metal compound.

It is believed that the complexing agents used in the present invention have a high chelating rate because they have a heterocyclic carboxylate structure as understood from formula (I), leading to an entropy advantage, and that the complexing agents provide efficient alkali formation because free carboxyl radicals are absent in neutral aqueous solution as opposed to EDTA.

The alkali generating process of the present invention is effectively applicable to image formation by silver photography and diazo photography, film formation of coating compositions, and anionically polymerizable adhesives, sealing/caulking agents, detergents, fungistats, and the like.

In the diazo photography, an azo dye is formed by effecting coupling reaction between a diazonium salt remaining in unexposed areas and a coupler under alkaline conditions as illustrated by the following formula.

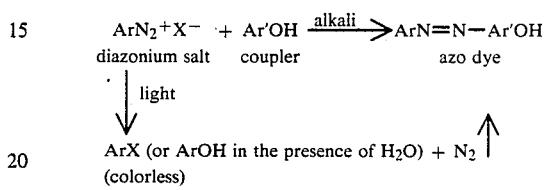

When the alkali generating process of the present invention is applied to the diazo photography, particularly a wet one-component process, a dispersion of the slightly soluble metal compound and the diazonium salt is coated onto a diazo type paper sheet, and the complexing agent added to the developing agent along with the coupler. Although conventional wet diazo processes use alkaline developing agents, the present invention permits the use of a neutral developing agent which is advantageous from the standpoints of safety and stability.

In the silver photography, development, that is, redox reaction between silver halide and developing agent, is performed under alkaline conditions. When the alkali generating process of the present invention is applied to the silver photography, the slightly soluble metal compound may be dispersed in the light-sensitive material and the complexing agent added to the developing solution, for example. This indicates the possible use of a non-alkaline developing solution. The non-alkaline developing solution is very stable to store and easy to handle.

A method for forming images by heating is described in detail in Japanese Patent Application Kokai No. 59-218443. In this method, a light-sensitive material having at least a silver halide, a dye-providing material, and a binder on a support is heated in the presence of a minor amount of water to produce or release a diffusible dye whereupon the diffusible dye is transferred to an image-receiving material. A combination of the complexing agent and the slightly water-soluble metal compound according to the present invention is applicable to the image forming method of heat development type.

In the heat development method, it is desirable that the slightly soluble metal compound and the complexing agent are independently contained in at least one layer on separate supports.

In one preferred embodiment, the slightly soluble metal compound is contained in a light-sensitive material and the complexing agent contained in an image-receiving material. The complexing agent may be supplied as a solution in water to participate in the reaction. It is desirable to incorporate the slightly soluble metal compound as a fine particulate dispersion which may be prepared by the methods described in Japanese Patent Application Kokai Nos. 59-174830 and 53-102733. In such dispersions, the compounds preferably have an average particle size of 50 μm or less, especially 5 μm or less.

The amount of the slightly soluble metal compound or complexing agent contained in a layer on a support depends on the particular type of compound used, the particle size of the slightly soluble metal compound, complexing reaction rate and other factors. Preferably, each compound is used in an amount of up to 50% by weight based on the weight of a coating containing the compound, and more preferably in an amount of 0.01 to 40% by weight. When the complexing agent is supplied as a solution in water to participate in the reaction, the aqueous solution is preferably prepared to a concentration of 0.005 to 5 mol/liter, more preferably 0.05 to 2 mol/liter. The content of the complexing agent in the reaction system is 1/100 to 100 folds in molar ratio, especially 1/10 to 20 folds more than that of the slightly soluble metal compound.

The image forming process of this type has one preferred embodiment of the type wherein a diffusible or mobile dye produced or released at sites corresponding or counter-curresponding to silver images can be transferred to a dye-fixing layer at the same time as development by heating in the presence of a small amount of water after imagewise exposure or simultaneously with imagewise exposure.

For this purpose, the light-sensitive material used includes on a support a light-sensitive layer (I) containing at least a silver halide, an optional organic metal salt, an optional reducing agent, a dye-providing substance, and a binder and a dye-fixing layer (II) capable of receiving a hydrophilic diffusible dye resulting fron layer (I).

The above-mentioned light-sensitive layer (I) and dye-fixing layer (II) may be formed on either the same support or separate suports. Also employable is an arrangement wherein dye-fixing layer (II) can be peeled from light-sensitive layer (I). For example, the light-sensitive material is imagewise exposed and uniformly heat developed, whereupon dye-fixing layer (II) or light-sensitive layer (I) may be removed by peeling. When a light-sensitive material having light-sensitive layer (I) coated on a support and an image-receiving or dye-fixing material having dye-fixing layer (II) coated on another support are individually prepared, the light-sensitive material is imagewise exposed, the dye-fixing material is placed on the light-sensitive material, and the assembly is uniformly heated in the presence of water, thereby transferring the diffusible dye to dye-fixing layer (II).

The dye-fixing layer (II) may contain a dye mordant, for example, for the purpose of dye fixing. The mordants used herein may be selected from a variety of mordants although polymeric mordants are preferred.

The silver halides used in this method are not particularly limited. Any of the photo-sensitive silver halides described in U.S. Pat. No. 4,500,626, for example, may be used.

The dye-providing materials useful in the method are those compounds which produce or release a diffusible dye in proportion or counter-proportion to the reaction of reducing a photo-sensitive silver halide to silver under high temperature conditions. Examples of the dye-providing materials are described in a number of patent publications: Japanese Patent Application Kokai Nos. 58-149046, 59-154445, 59-165054, 59-180548, 59-218443, Japanese Patent Application No. 60-33491, and U.S. Pat. Nos. 4,503,137, 4,500,626, 4,483,914, 4,455,363.

Hydrophilic binders such as gelatin are preferred as the binder.

In this method, the photo-sensitive silver halide may be combined with an organic metal salt as an oxidizing agent. It is then necessary that the photo-sensitive silver halide be in contact with or in the vicinity of the organic metal salt.

Preferred among these organic metal salts are organic silver salts. The organic compounds which may be used to form the organic silver salt oxidizing agents are those compounds described in U.S. Pat. No. 4,500,626, columns 52–53. Also useful are silver salts of carboxylic acids such as silver salt of phenylpropiolic acid described in Japanese Patent Application No. 60-113235 and silver acetylene derivatives. The organic silver salts may be used alone or in admixture of two or more.

In the image forming process of this type, a reducing material is desirably contained in the light-sensitive material. The reducing materials include conventional well-known reducing material and those compounds encompassed in the above-mentioned dye-providing materials and having reducing nature. Also included are reducing agent precursors which themselves have no reducing nature, but exhibit reducing nature under the action of a nucleophilic reagent or heat during development process.

Examples of the reducing agents are those described in U.S. Pat. No. 4,500,626, columns 49–50.

The amount of water used in this method may be as small as at least one tenth of the weight of the overall coatings of the light-sensitive and dye-fixing materials, preferably from one tenth of said weight up to the weight of solvent corresponding to the maximum swollen volume of the overall coatings, particularly up to the weight of solvent corresponding to the maximum swollen volume of the overall coatings minus the weight of the overall coatings.

Coatings in swollen state are unstable and have the likelihood that local bleeding will occur under certain conditions. To avoid such bleeding, water should be supplied in an amount up to that corresponding to the maximum swollen volume of the overall coatings of light-sensitive material and dye-fixing material.

The heating temperature ranges from 50° C. to the boiling point of water, preferably from 60° C. to 100° C.

The present process is also applicable to adhesives, coatings, detergents, fungistats, and other alkali requiring agents.

BENEFITS OF THE INVENTION

According to the present invention, the complexing agent of formula (I) and the slightly water-soluble metal compound of formula (II), which are neutral as such, are reacted in the presence of water to form an alkaline compound. The present process is thus capable of instantaneously generating an alkali from neutral compounds while the materials involved are improved in stability and safe to handle.

Because of such advantages, the alkali generating process of the present invention is effectively applicable to image formation by silver photography and diazo photography, film formation of coating composition, anionically polymerizable adhesives, sealing/caulking agents, detergents, fungistats, and the like.

EXAMPLES

In order that those skilled in the art may better understand how the present invention may be practiced, the following examples are given by way of illustration and not by way of limitation.

EXAMPLE 1

(Combination No. 10)

In about 50 ml of 1N sodium hydroxide aqueous solution was dissolved 6.15 grams (50 mmol) of picolinic acid, yielding a solution of pH 7.2. With stirring, 2.03 grams (25 mmol) of ZnO was added to the solution.

The mixture was measured for pH to find that the pH reached a maximum of 13.2 after 3 minutes since mixing. A mixture of ZnO and water was measured to be pH 6.6.

EXAMPLE 2

For the following combinations of the complexing agents of formula (I) with the metal compounds of formula (II), the same procedure as in Example 1 was repeated. A rapid pH increase was observed in all runs. The available maximum pH is shown for each of the combinations.

| Combination | Formula (I) | Formula (II) | Maximum pH |
|---|---|---|---|
| a(9) | pyridine-2-CO$_2$Na | Basic zinc carbonate | 13.3 |
| b(12) | 2,6-pyridine(CO$_2$Na)$_2$ | Basic zinc carbonate | 12.7 |
| c(6) | 2,6-pyridine(CO$_2$K)$_2$ | Basic zinc carbonate | 12.8 |
| d(15) | 2,6-pyridine(CO$_2$Na)$_2$ | CaCO$_3$ | 11.3 |
| e(17) | 2,5-pyridine(CO$_2$Na)$_2$ | Basic zinc carbonate | 12.8 |
| f(3) | pyridine-2-CO$_2$K | Zn(OH)$_2$ | 12.8 |
| g(14) | 2,6-pyridine(CO$_2$Na)$_2$ | Zn(OH)$_2$ | 12.4 |
| h(19) | pyridine-2-CO$_2$Na | Co(OH)$_2$ | 13.3 |
| i(20) | 2,6-pyridine(CO$_2$Na)$_2$ | Co(OH)$_2$ | 13.2 |
| j(33) | pyridine-2-CO$_2$Na | Basic cobalt carbonate | 12.8 |
| k(21) | 2,6-pyridine(CO$_2$Na)$_2$ | Basic cobalt carbonate | 12.6 |
| l(22) | pyridine-2-CO$_2$Na | Cu(OH)$_2$ | 12.9 |
| m(34) | 2,6-pyridine(CO$_2$Na)$_2$ | Cu(OH)$_2$ | 12.4 |
| n(23) | pyridine-2-CO$_2$Na | Basic copper carbonate | 13.7 |

| Combination | Formula (I) | Formula (II) | Maximum pH |
|---|---|---|---|
| o(24) | NaO₂C–(pyridine)–CO₂Na structure | Basic copper carbonate | 13.6 |
| p(35) | (pyridine)–CO₂Na structure | Nickel hydroxide | 10.7 |
| q(25) | NaO₂C–(pyridine)–CO₂Na structure | Nickel hydroxide | 12.3 |
| r(36) | (pyridine)–CO₂Na structure | Basic nickel carbonate | 12.2 |
| s(26) | NaO₂C–(pyridine)–CO₂Na structure | Basic nickel carbonate | 12.7 |
| t(37) | (pyridine)–CO₂Na structure | MnCO₃ | 10.0 |
| u(27) | NaO₂C–(pyridine)–CO₂Na structure | MnCO₃ | 11.1 |

EXAMPLE 3

An aqueous solution of sodium picolinate was prepared from 12.3 grams (100 mmol) of picolinic acid, about 4 grams of sodium hydroxide, and 50 ml of water while adjusting the solution to pH 7.2 with an amount of NaOH. With stirring, 2.84 grams (25 mmol of $Zn^{2+}$) of basic zinc carbonate, $3Zn(OH)_2 \cdot 2ZnCO_3 \cdot H_2O$ was added to the solution. The resulting mixture indicated pH 13.8.

It is seen that the larger amount of the complexing agent than in Combination a in Example 2 results in a higher pH.

Thereafter, the mixture was filtered and titrated with 1N hydrochloric acid. Likewise, a sample of Combination a in Example 2 was titrated. It was found that 7.2 mmol (efficiency 24%) of NaOH and 10 mmol (efficiency 100%) of $Na_2CO_3$ had formed in the sample of this Example, whereas 4.8 mmol (efficiency 16%) of NaOH and 6.0 mmol (efficiency 60%) of $Na_2CO_3$ had formed in the sample of Combination a. These data demonstrate the efficacy of the present alkali generating process.

EXAMPLE 4

(Combination No. 12)

In about 50 ml of 1N sodium hydroxide aqueous solution was dissolved 4.18 grams (25 mmol) of dipicolinic acid, yielding a solution of pH 7.2 (Solution A).

Separately, 8.36 grams (50 mmol) of dipicolinic acid and about 4 grams of NaOH were dissolved in 50 ml of water, yielding a solution of sodium dipicolinate having pH 7.2 (Solution B).

With stirring, 2.84 grams (25 mmol of $Zn^{2+}$) of basic zinc carbonate was added to each of solutions A and B. Using a pH meter, the mixtures were monitored for change of pH with time. The results are shown below.

| Solution | pH change with time Time (sec.) | | | | |
|---|---|---|---|---|---|
| | 0 | 5 | 10 | 20 | 30 |
| A | 7.2 | 12.4 | 12.7 | 12.7 | 12.7 |
| B | 7.2 | 13.2 | 13.5 | 13.6 | 13.6 |

As seen from the above data, the pH increase is very fast. With the response time of the pH meter taken into account, it is considered possible to instantaneously increase the pH beyond 13.

EXAMPLE 5

6.15 grams (50 mmol) of picolinic acid was dissolved in about 50 ml of 1N sodium hydroxide aqueous solution so as to provide pH 7.2 (Solution C).

3.08 grams (25 mmol) of picolinic acid was dissolved in about 25 ml of 1N sodium hydroxide aqueous solution so as to provide pH 7.2 (Solution D).

For comparative purpose, 7.3 grams (25 mmol) of EDTA (ethylenediaminetetraacetic acid) was dissolved in about 70 ml of 1N sodium hydroxide aqueous solution so as to provide pH 7.2 (Solution E).

With stirring, 2.48 grams (25 mmol) of zinc hydroxide was added to each of solutions C, D, and E. Using a pH meter, the mixtures were monitored for change of pH with time. The results are shown below.

| Solution | pH change with time Time (sec.) | | | | | |
|---|---|---|---|---|---|---|
| | 0 | 5 | 10 | 20 | 30 | 60 | Final |
| C | 7.2 | 12.2 | 12.5 | 12.6 | 12.7 | 12.7 | 12.8 |
| D | 7.2 | 12.1 | 12.4 | 12.6 | 12.6 | 12.7 | 12.7 |
| E* | 7.2 | 8.2 | 8.7 | 9.1 | 9.5 | 11.0 | 11.9 |

*comparison

As compared with the combination of EDTA3Na with zinc hydroxide described in U.S. Pat. No. 3,260,598, the alkali generating process using combinations of specific compounds as defined in the present invention has the advantages of (1) a very fast pH increase rate, (2) a large amount of alkali generated, and (3) an increased amount of alkali generated per unit weight or equivalent of the complexing agent, that is, an

21 increased efficiency. Another advantage is found in that (4) sodium picolinate is approximately neutral although an aqueous solution of EDTA3Na is weakly alkaline in itself (pH 8.2 reported in the above-cited patent specification, and pH 9.3 in 1% aqueous solution reported in The Merck Index, 8th Ed.).

It is believed that these advantages are ascribed to the facts that the complexing agents used in the present invention have a high chelating rate because they have a heterocyclic carboxylate structure as understood from formula (I), leading to an entropy advantage, and that the complexing agents provide efficient alkali formation because free carboxyl radicals are absent in neutral aqueous solution as opposed to EDTA.

EXPERIMENT 1

Application to Diazo Photographic Material

A diazo composition having the following formulation was coated on a sheet of raw paper to a wet thickness of 100 μm.

| Diazo composition | |
|---|---|
| 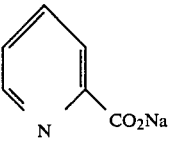 | 30 mg |
| Citric acid | 20 mg |
| Methylene blue | 0.1 mg |
| Basic zinc carbonate | 200 mg |

After drying, the diazo paper was exposed to ultraviolet radiation through a transparent text original by means of a conventional diazo exposure equipment. The exposed sample was treated with a developing solution having the following composition.

| Developing solution composition | |
|---|---|
| 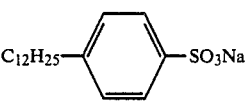 | 10 g |
| | 60 g |
| Sodium tetraborate decahydrate | 10 g |
| Water | 1000 ml |

There was obtained a positive purple image having an optical density of 1.05.

22

EXPERIMENT 2

Application to Fungistat

A fungistatic composition was prepared from the following ingredients. Percents are by weight.

| | |
|---|---|
| Liquid A (dispersion) | 2% |
| Zinc oxide | |
| Liquid B (aqueous solution) | 3.6% |
| Sodium hypochlorite | |
| (pyridine-2-carboxylate structure) | 5% |
| (C$_{12}$H$_{25}$-phenyl-SO$_3$Na) | 0.8% |

A moldy wall was sprayed with liquid A and then with liquid B, whereupon the mold disappeared after 5 minutes.

One conventional fungistatic composition comprising 3.6% of sodium hypochlorite, 1% of NaOH, and 0.8% of a surface-active agent has a pH of approximately 13. It is undesirable in safety aspect to use such an alkaline composition by spraying. According to the present invention, liquids A and B are handled in safe because no alkali is formed before they are reacted on the wall surface.

EXPERIMENT 3

Application to Silver Photography (Dry Process)

Preparation of Silver Benzotriazole Emulsion Containing Light-Sensitive Silver Bromide A silver benzotriazole emulsion was prepared as follows. Ten (10) grams of gelatin and 6.5 grams of benzotriazole were dissolved in 1000 ml of water. The resulting solution was agitated at 50° C. A solution of 8.5 grams silver nitrate in 100 ml water was added to the solution over a period of 2 minutes.

A solution of 1.2 grams potassium bromide in 50 ml water was then added over a period of 2 minutes. The resulting silver benzotriazole emulsion was adjusted to such pH that an excess salt precipitated, and the excess salt was filtered off. The emulsion was then adjusted to pH 6.0, obtaining a silver benzotriazole emulsion in a yield of 200 grams.

Preparation of Gelatin Dispersion of Dye-Providing Substance

Ten (10) grams of dye-providing material having the formula:

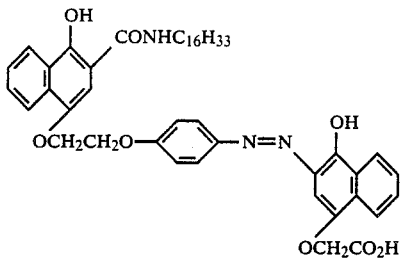

was dissolved together with 0.5 grams of succinic acid-2-ethylhexyl ester sodium sulfonate and 4 grams of tricresyl phosphate (TCP) in 20 ml of cyclohexanone by heating at about 60° C., obtaining a homogeneous solution. The solution was mixed with 100 grams of a 10 wt% lime-treated gelatin solution by agitation, and the mixture was dispersed with a homogenizer for 10 minutes at 10,000 rpm.

Preparation of Light-Sensitive Coating Composition

A light-sensitive coating composition was prepared from the following formulation.

| Light-sensitive coating composition | |
|---|---|
| (a) Silver benzotriazole emulsion containing light-sensitive silver bromide | 10 g |
| (b) Dye-providing substance dispersion | 3.5 g |
| (c) Gelatin (10% aqueous solution) | 5 g |
| (d) 0.2 g 2,6-dichloro-4-aminophenol in 2 ml methanol | |
| (e) Aqueous solution of 10% compound having the formula: $C_9H_{19}\text{---}\bigcirc\text{---}O\text{---}(CH_2CH_2O)_8\text{---}H$ | 1 ml |
| (f) Zinc hydroxide (10% aqueous dispersion) | 3.0 g |

Components (a) to (f) were mixed and dissolved by heating. The resulting coating solution was applied to a polyethylene terephthalate base film of 180 μm thick to a wet thickness of 30 μm.

Further, the following composition was coated thereon as a protective coating.

| Protective composition | |
|---|---|
| (g) 10% gelatin aqueous solution | 30 ml |
| (h) water | 60 ml |
| (i) Aqueous solution of 2 wt % 2,4-dichloro-6-hydroxy-s-triazine | 5 ml |

Components (g) to (i) were mixed. The protective composition was coated onto the light-sensitive coating to a wet thickness of 30 μm and then dried, obtaining a light-sensitive material.

Next, the preparation of a dye-fixing material will be described.

Preparation of Dye-Fixing Material

Ten (10) grams of poly(methyl acrylate-co-N,N,N-trimethyl-N-vinylbenzylammonium chloride) having a molar ratio of methyl acrylate to vinylbenzyl ammonium chloride of 1:1 was dissolved in 175 ml of water, and the solution was homogeneously mixed with 100 grams of 10 wt% lime-treated gelatin. The resulting mixture was combined with 25 ml of an aqueous solution of 4% 2,4-dichloro-6-hydroxy-1,3,5-triazine and uniformly spread onto a paper substrate laminated with polyethylene having titanium dioxide dispersed therein, thereby forming a dye-fixing layer having a uniform wet thickness of 90 μm.

A solution obtained by mixing and dissolving 2.0 grams of potassium picolinate, 18 ml of water, 20 grams of 10% gelatin, and 4.8 ml of an aqueous solution of 1% succinic acid-2-ethylhexyl ester sodium sulfate was further coated thereon to a wet film thickness of 30 μm. After drying, there was obtained a dye-fixing material having a mordant layer.

The light-sensitive material was imagewise exposed for ten seconds at 2000 lux under a tungsten lamp. Water was applied by means of a wire bar in an amount of 20 ml per square meter to the emulsion surface of the exposed light-sensitive material, which was superimposed on the dye-fixing material such that their effective surfaces faced one another. After heating for 20 seconds through heat rollers at such a temperature that the temperature of the wet film reached 90° to 95° C., the dye-fixing material was peeled from the light-sensitive material. The dye-fixing material then bore thereon clear images. The maximum density (Dmax) and minimum density (Dmin) of the color images were measured by means of a Macbeth (RD-519) reflection densitometer to find sufficiently high image densities.

EXPERIMENT 4

Application to Silver Photography (Wet Process)
Preparation of Silver Iodobromide Emulsion In 3000 ml of water were dissolved 40 grams of gelatin and 26 grams of potassium bromide (KBr). The solution was agitated at 50° C. Then 34 grams of silver nitrate in 200 ml of water was added to the solution over 10 minutes. Thereafter, 13.3 grams of potassium iodide (KI) in 100 ml of water was added to the solution over 2 minutes.

The resulting silver iodobromide emulsion was adjusted to such pH that an excess salt precipitated, and the excess salt was filtered off. The emulsion was then adjusted to pH 6.0, obtaining a silver iodobromide emulsion in a yield of 400 grams.

A coating composition having the formulation shown below was coated onto a polyethylene terephthalate support to a wet thickness of 60 μm and then dried, obtaining a light-sensitive material.

| | |
|---|---|
| (1) Silver iodobromide emulsion | 12 g |
| (2) 10% gelatin | 7 g |
| (3) Aqueous dispersion of 10% basic zinc carbonate (average particle size 0.2 μm) | 10 g |
| (4) Aqueous solution of 4% 1,2-bis-(vinylsulfonylacetamide)ethane | 1 ml |

The light-sensitive material was imagewise exposed for ten seconds at 2000 lux under a tungsten lamp. The exposed light-sensitive material was then developed for 3 minutes in 1 liter per square meter of the light-sensitive material of a developing solution having the composition shown below at room temperature, dipped for 1 minute in a fixing solution (trade name, Fuji Fix), and then rinsed with water for 3 minutes, obtaining an exposed silver image. Using a Macbeth (TD-504) transmission densitometer, the image was measured to have a maximum density (Dmax) of 0.94 and a minimum density (Dmin) of 0.10.

| Developing solution | |
| --- | --- |
| Sodium sulfite | 10 g |
| Hydroquinone | 6 g |
| 1-phenyl-3-pyrazolidone | 0.25 g |
| Potassium bromide | 1 g |
| Potassium picolinate | 8.0 g |
| Water | to a total of 1 liter |

EXPERIMENT 5

Application to Heat-Developable Color Light-Sensitive Material

Preparation of Silver Benzotriazole Emulsion

A silver benzotriazole emulsion was prepared as follows. Twenty eight (28) grams of gelatin and 13.2 grams of benzotriazole were dissolved in 300 ml of water. The resulting solution was agitated at 40° C. A solution of 17 grams silver nitrate in 100 ml water was added to the solution over a period of 2 minutes.

The resulting silver benzotriazole emulsion was adjusted to such pH that an excess salt precipitated, and the excess salt was filtered off. The emulsion was then adjusted to pH 6.30, obtaining a silver benzotriazole emulsion in a yield of 400 grams.

Preparation of Silver Halide Emulsion

A silver halide emulsion used in first and fifth layers was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide and another aqueous solution of 0.59 mols of silver nitrate in 600 ml of water were concurrently added to the gelatin solution at an equal flow rate over a period of 40 minutes. In this way, there was prepared a monodispersed cubic silver chlorobromide emulsion having an average grain size of 0.40 μm (bromine 50 mol%).

After rinsing with water and desalting, 5 mg of sodium thiosulfate and 20 mg of 4-hydroxy-6-methyl-1,3,3a,7-tetraazaindene were added to effect chemical sensitization at 60° C. There was obtained an emulsion in a yield of 600 grams.

A silver halide emulsion used in a third layer was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide and another aqueous solution of 0.59 mols of silver nitrate in 600 ml of water were concurrently added to the gelatin solution at an equal flow rate over a period of 40 minutes. In this way, there was prepared a monodispersed cubic silver chlorobromide emulsion having an average grain size of 0.35 μm (bromine 80 mol%).

After water rinsing and desalting, 5 mg of sodium thiosulfate and 20 mg of 4-hydroxy-6-methyl-1,3,3,a,7-tetraazaindene were added to effect chemical sensitization at 60° C. There was obtained an emulsion in a yield of 600 grams.

Next, a dispersion of a dye-providing substance in gelatin was prepared as follows.

Preparation of Gelatin Dispersion of Dye-Providing Substance

A homogeneous solution was prepared by weighing 15 grams of yellow dye-providing substance (A) having the formula shown below and 7.5 grams of triisononyl phosphate, adding them to 40 ml of ethyl acetate, and heating at about 60° C. for dissolution. The solution was mixed with 100 grams of a 10 wt% lime-treated gelatin solution and 60 ml of an aqueous solution of 2.5% sodium dodecylbenzenesulfonate as a surface-active agent by agitation, and the mixture was dispersed with a homogenizer for 10 minutes at 10,000 rpm. This dispersion is called yellow dye-providing substance dispersion.

A magenta dye-providing substance dispersion was prepared by the same procedure as above except that a magenta dye-providing substance (B) was used as the dye-providing substance and 7.5 grams of tricresyl phosphate was usd as the high boiling solvent.

A cyan dye-providing substance dispersion was prepared by the same procedure as above except that a cyan dye-providing substance (C) was used as the dye-providing substance.

Using these preparations, there was prepared a color light-sensitive material of multi-layer structure as shown in the following formulation:

[FORMULATION]

Sixth layer
    gelatin (coating weight 800 mg/m$^2$)
    hardener*$^3$ (coating weight 16 mg/m$^2$)
    silica*$^5$ (coating weight 100 mg/m$^2$)
    zinc hydroxide (coating weight 300 mg/m$^2$)
Fifth layer: Green-sensitive emulsion layer
    silver chlorobromide emulsion (bromine 50 mol %, coating weight 400 mg/m$^2$ of Ag)
    silver acetylene emulsion (coating weight 60 mg/m$^2$ of Ag)
    silver benzotriazole emulsion (coating weight 20 mg/m$^2$ of Ag)
    sensitizing dye D-1 (coating weight $10^{-6}$ mol/m$^2$)
    hardener*$^3$ (coating weight 16 mg/m$^2$)
    yellow dye-providing substance (A) (coating weight 400 mg/m$^2$)
    gelatin (coating weight 800 mg/m$^2$)
    high-boiling solvent*$^4$ (coating weight 800 mg/m$^2$)
    surface-active agent*$^2$ (coating weight 100 mg/m$^2$)
Fourth layer: Intermediate layer
    gelatin (coating weight 900 mg/m$^2$)
    hardener*$^3$ (coating weight 18 mg/m$^2$)
    zinc hydroxide (coating weight 300 mg/m$^2$)
Third layer: Red-sensitive emulsion layer
    silver chlorobromide emulsion (bromine 80 mol %, coating weight 300 mg/m$^2$ of Ag)
    silver acetylene emulsion (coating weight 60 mg/m$^2$ of Ag)
    silver benzotriazole emulsion (coating weight 20 mg/m$^2$ of Ag)
    sensitizing dye D-2 (coating weight $8 \times 10^{-7}$ mol/m$^2$)
    hardener*$^3$ (coating weight 18 mg/m$^2$)
    magenta dye-providing substance (B) (coating weight 400 mg/m$^2$)
    gelatin (coating weight 1400 mg/m$^2$)
    high-boiling solvent*$^4$ (coating weight 600 mg/m$^2$)
    surface-active agent*$^2$ (coating weight 100 mg/m$^2$)
Second layer: Intermediate layer
    gelatin (coating weight 800 mg/m$^2$)
    hardener*$^3$ (coating weight 16 mg/m$^2$)
    zinc hydroxide (coating weight 300 mg/m$^2$)
First layer: Infrared-sensitive emulsion layer
    silver chlorobromide emulsion (bromine 50 mol %, coating weight 300 mg/m$^2$ of Ag)
    silver acetylene emulsion (coating weight 25 mg/m$^2$ of Ag)
    silver benzotriazole emulsion (coating weight 50 mg/m$^2$

27

-continued

[FORMULATION]

of Ag)
sensitizing dye D-3 (coating weight $10^{-8}$ mol/m$^2$)
hardener*$^3$ (coating weight 16 mg/m$^2$)
cyan dye-providing substance (C) (coating weight 300 mg/m$^2$)
gelatin (coating weight 600 mg/m$^2$)
high-boiling solvent*$^4$ (coating weight 600 mg/m$^2$)

28

-continued

[FORMULATION]

surface-active agent*$^2$ (coating weight 100 mg/m$^2$)
Support*$^1$

*$^1$polyethylene terephthalate, thickness 180 μm

*$^2$ $C_9H_{19}$—⟨phenyl⟩—O—$(CH_2CH_2O)_8$—H

*$^3$1,2-bis(vinylsulfonylacetamide)ethane
*$^4$(iso-$C_9H_{19}O)_3P$=O
*$^5$size 4 μm (A)

(B)

(C)

-continued

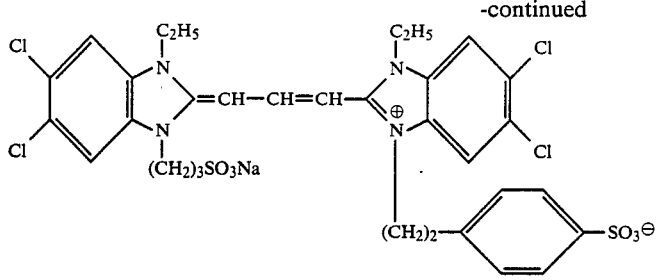
(D-1)

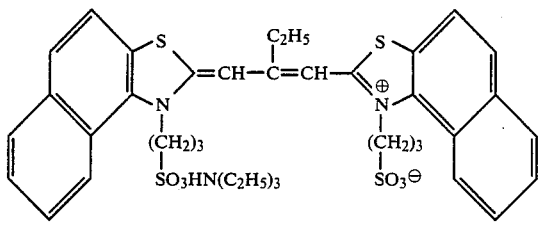
(D-2)

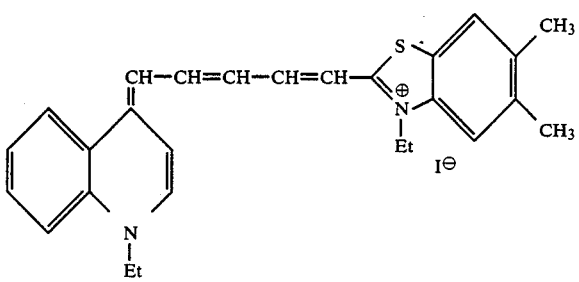
(D-3)

A dye-fixing material was prepared as follows.

In 1300 ml of water were dissolved 63 grams of gelatin, 130 grams of a mordant having the structure shown below, and 100 grams (0.28 mols) of trisodium ethylenediaminetetraacetate (EDTA3Na). The solution was coated onto a polyethylene-laminated paper support to a wet film thickness of 45 μm and then dried.

Mordant:

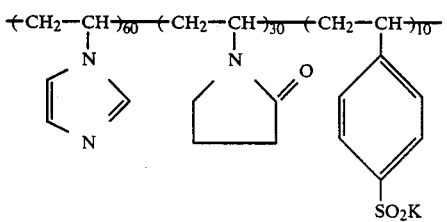

A solution of 35 grams of gelatin and 1.05 grams of 1,2-bis(vinylsulfonylacetamide)ethane in 800 ml of water was coated on the mordant layer to a wet film thickness of 17 μm and then dried, obtaining a dye-fixing material D-10.

In addition, dye-fixing materials D-11 and D-12 were prepared by the same procedure as described for D-10 except that 100 grams of EDTA3Na was replaced by amounts of the compounds as indicated in the following Table.

The above-prepared multilayered color light-sensitive material was exposed for one second at 500 lux under a tungsten lamp through three color separation filters G, R, and IR having a continuously varying density. It should be noted that filter G is a 500–600 nm band pass filter, filter R is a 600–700 nm band pass filter, and filter IR is a filter transmitting light having wavelengths of at least 700 nm.

Water was applied by means of a wire bar in an amount of 13 ml per square meter to the emulsion surface of the thus exposed light-sensitive material, which was superimposed on each of dye-fixing materials D-10 to D-12 such that their effective surfaces faced one another. After heating for 25 seconds through heat rollers at such a temperature that the temperature of the wet film reached 90° to 95° C., the dye-fixing material was peeled from the light-sensitive material. The dye-fixing material then bore thereon clear images of yellow (Y), magenta (M), and cyan (C) corresponding to the three color separation filters G, R, and IR. The maximum density (Dmax) and minimum density (Dmin) of the respective color images were measured by means of a Macbeth (RD-519) reflection densitometer. The results are shown in Table.

TABLE

| Dye-fixing material | | | | | | |
|---|---|---|---|---|---|---|
| No. | Complexing compound | | | | | Amount |
| D-10* | trisodium ethylenediaminetetraacetate | | | | | 0.28 mol |
| D-11* | tripotassium citrate | | | | | 0.28 mol |
| D-12 | potassium picolinate | | | | | 0.50 mol |
| | Maximum density | | | Minimum density | | |
| No. | Y | M | C | Y | M | C |
| D-10* | 0.72 | 0.84 | 0.65 | 0.08 | 0.10 | 0.08 |
| D-11* | 0.07 | 0.07 | 0.07 | 0.07 | 0.07 | 0.07 |
| D-12 | 1.82 | 2.06 | 2.25 | 0.12 | 0.14 | 0.14 |

*comparison

Although U.S. Pat. No. 3,260,598 discloses a method for forming a base using a combination of Zn(OH)$_2$ with trisodium ethylenediaminetetraacetate or tripotassium citrate, it is evident from the above Table that the use of the alkali metal salts of ligands disclosed in said patent as the complexing compound results in color images having a very low density.

Although one typical combination of complexing agent and metal compound falling within the scope of the present invention was used in these experiments, equivalent results were obtained with other combinations.

The foregoing examples demonstrate the improved results of the present invention.

We claim:

1. A process for generating an alkali, comprising reacting a complexing agent having the general formula:

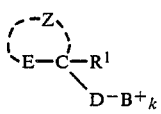  (I)

with a slightly water-soluble metal compound having the general formula:

$$M_nY_m \quad (II)$$

in the presence of water, wherein formula (I),

C represents carbon;

$D^-$ represents $-CO_2-$, $-SO_3-$ or $-PO_3^{2-}$;

$B^+$ represents an alkali metal ion, a substituted or unsubstituted guanidinium ion, an amidinium ion or a quaternary ammonium ion;

k is equal to 1 or 2, the value of k being selected so as to establish equilibrium between anions and cations in formula (I), E represents $-S-$, $-O-$, or $-NR^2-$ and adjoins the C atom in formula (I) wherein $R^2$ represents H or various substituents or a direct bond to form a double bond between the N atom and the adjoining atom;

Z represents a group of atoms necessary to complete a heterocyclic ring with C and E, wherein the heterocyclic ring may have a $-D^-B^+{}_k$ or another substituent attached thereto or form a fused ring and the heterocyclic ring formed by Z, C, and E is selected from the group consisting of a pyridine ring, quinoline ring, pyrazine ring, thiophene ring, furan ring and tetrahydrofuran ring;

$R^1$ represents H or various substituents or a direct bond to form a double bond between the C atom and the adjoining atom; and in formula (II), M represents a metal other than alkali metals;

Y represents an oxide ion, a hydroxide ion, a carbonate ion, a silicate ion, a borate ion, or an aluminate ion;

n and m represent integers selected so as to establish equilibrium between the valences of M and Y; and the compound of formula (II) may contain water of crystallization or form a double salt.

2. An alkali generating process according to claim 1 wherein the complexing compound has the general formula:

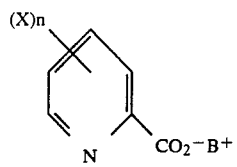  (III)

wherein X represents a substituent selected from the group consisting of $-CO_2^-B^+$, $-SO_3^-B^+$, hydrogen atom, halogen atoms, cyan radical, nitro radical, hydroxyl radical, substituted or unsubstituted alkyl radicals, cycloalkyl radicals, aralkyl radicals, aryl radicals, alkenyl radicals, alkynyl radicals, alkoxy radicals, aryloxy radicals, acylamino radicals, acyl radicals, amino radicals, alkylthio radicals, arylthio radicals, heterocyclic radicals, alkylsulfonyl radicals, arylsulfonyl radicals, and carbamoyl radicals, n is an integer having a value of 0 to 4, when n is 2 or more, X's may be the same or different or combined together to form a ring, and $B^+$ is as defined for formula (I).

3. An alkali generating process according to claim 1 wherein $B^+$ is selected from the group consisting of $Li^+$, $Na^+$, $K^+$, $Cs^+$,

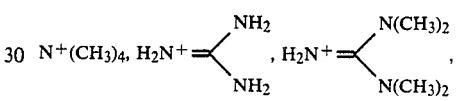

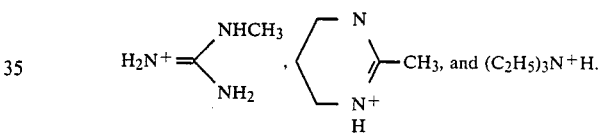

4. An alkali generating process according to claim 1 wherein M is selected from the group consisting of $Ca^{2+}$, $Ba^{2+}$, $Sr^{2+}$, $Mg^{2+}$, $Zn^{2+}$, $Co^{2+}$, $Ni^{2+}$, $Cu^{2+}$, $Mn^{2+}$, and $Fe^{2+}$.

5. An alkali generating process according to claim 1 wherein Y is selected from the group consisting of oxide, hydroxide and carbonate.

6. An alkali generating process according to claim 1 wherein the combination of the complexing agents of formula (I) with the metal compounds of formula (II) is selected from the following combinations Nos. 1 to 37

| Combination No. | Formula (I) | Formula (II) |
| --- | --- | --- |
| 1 | ![pyridine-CO2K] | Basic zinc carbonate |
| 2 | ![pyridine-CO2K] | ZnO |

-continued

| Combination No. | Formula (I) | Formula (II) |
|---|---|---|
| 3 | pyridine-2-CO₂K | Zn(OH)₂ |
| 4 | pyridine-2,6-(CO₂K)₂ | Zn(OH)₂ |
| 5 | pyridine-2,6-(CO₂K)₂ | ZnO |
| 6 | pyridine-2,6-(CO₂K)₂ | Basic zinc carbonate |
| 7 | pyridine-2-CO₂H·HN=C(NH₂)₂ | Basic zinc carbonate |
| 8 | pyridine-2-CO₂H·HN=C(NH₂)₂ | ZnO |
| 9 | pyridine-2-CO₂Na | Basic zinc carbonate |
| 10 | pyridine-2-CO₂Na | ZnO |
| 11 | pyridine-2-CO₂Na | Zn(OH)₂ |
| 12 | pyridine-2,6-(CO₂Na)₂ | Basic zinc carbonate |
| 13 | pyridine-2,6-(CO₂Na)₂ | ZnO |
| 14 | pyridine-2,6-(CO₂Na)₂ | Zn(OH)₂ |
| 15 | pyridine-2,6-(CO₂Na)₂ | CaCO₃ |
| 16 | pyridine-2,3-(CO₂K)₂ | Basic zinc carbonate |
| 17 | pyridine-2,5-(CO₂Na)₂ | Basic zinc carbonate |
| 18 | pyridine-2,5-(CO₂Na)₂ | Zn(OH)₂ |
| 19 | pyridine-2-CO₂Na | Co(OH)₂ |
| 20 | pyridine-2,6-(CO₂Na)₂ | Co(OH)₂ |

-continued

| Combination No. | Formula (I) | Formula (II) |
|---|---|---|
| 21 | NaO₂C-pyridine-2,6-CO₂Na | Basic cobalt carbonate |
| 22 | pyridine-2-CO₂Na | Cu(OH)₂ |
| 23 | pyridine-2-CO₂Na | Basic copper carbonate |
| 24 | NaO₂C-pyridine-2,6-CO₂Na | Basic copper carbonate |
| 25 | NaO₂C-pyridine-2,6-CO₂Na | Ni(OH)₂ |
| 26 | NaO₂C-pyridine-2,6-CO₂Na | Basic nickel carbonate |
| 27 | NaO₂C-pyridine-2,6-CO₂Na | MnCO₃ |
| 28 | 6-methyl-pyridine-2-CO₂K | Basic zinc carbonate |
| 29 | quinoline-2-CO₂K | Zn(OH)₂ |
| 30 | 4-(N,N-dimethylamino)-pyridine-2,6-di-CO₂K | Zn(OH)₂ |
| 31 | 4-methoxy-pyridine-2,6-di-CO₂K | Basic zinc carbonate |
| 32 | pyridine-2,5-di-CO₂K | ZnO |
| 33 | pyridine-2-CO₂Na | Basic cobalt carbonate |
| 34 | NaO₂C-pyridine-2,6-CO₂Na | Cu(OH)₂ |
| 35 | pyridine-2-CO₂Na | Nickel hydroxide |
| 36 | pyridine-2-CO₂Na | Basic nickel carbonate |
| 37 | pyridine-2-CO₂Na | MnCO₃ |

* * * * *

UNITED STATES PATENT AND TRADEMARK OFFICE
CERTIFICATE OF CORRECTION

PATENT NO. : 4,740,363

DATED : April 26, 1988

INVENTOR(S) : Hiroyuki Hirai et al

It is certified that error appears in the above-identified patent and that said Letters Patent is hereby corrected as shown below:

Please make the following changes to the above-identified patent:

Column 31, line 32, delete "$-CO_2-$" and insert -- $-CO_2^-$ -- delete "$-SO_3-$" and insert -- $-SO_3^-$ ".

Signed and Sealed this

Ninth Day of May, 1989

*Attest:*

DONALD J. QUIGG

*Attesting Officer*  *Commissioner of Patents and Trademarks*